United States Patent [19]

Maly

[11] 4,289,976
[45] Sep. 15, 1981

[54] CIRCUIT ARRANGEMENT FOR THE TRANSMISSION OF DIGITAL DATA

[75] Inventor: Hans-Peter Maly, Darmstadt, Fed. Rep. of Germany

[73] Assignee: Robert Bosch GmbH, Stuttgart, Fed. Rep. of Germany

[21] Appl. No.: 91,524

[22] Filed: Nov. 5, 1979

[30] Foreign Application Priority Data

Nov. 10, 1978 [DE] Fed. Rep. of Germany ....... 2848803

[51] Int. Cl.³ .............................................. H03K 5/13
[52] U.S. Cl. ........................ 307/247 R; 307/DIG. 1; 307/269; 328/63; 340/147 SY
[58] Field of Search ............. 307/DIG. 1, 247 R, 269, 307/208, 215, 271; 328/63; 340/147 SY, 147 LP

[56] References Cited

U.S. PATENT DOCUMENTS

| | | | |
|---|---|---|---|
| 3,920,918 | 11/1975 | Thomas | 328/63 |
| 3,979,732 | 9/1976 | Hepworth et al. | 307/DIG. 1 |
| 4,039,960 | 8/1977 | Clark | 307/DIG. 1 |
| 4,045,662 | 8/1977 | Scopaz | 307/269 |

OTHER PUBLICATIONS

Interfacing A Teletypewriter With An IC Microprocessor, by Robert Stevens, Electronics, 7/74, p. 99.

Primary Examiner—Stanley D. Miller, Jr.
Assistant Examiner—B. P. Davis
Attorney, Agent, or Firm—Frishauf, Holtz, Goodman & Woodward

[57] ABSTRACT

A circuit arrangement is described for the transmission of a digital data signal. The circuit arrangement is inserted as an asynchronous interface into the transmission path between digital data handling systems with differing clock frequencies $f_1$ and $f_2$. The circuit arrangement comprises a register 1 of D flip-flops for buffering the input data $D_1$. The clocking of the register 1 is performed with a special clock signal $f_{Inter}$, which is derived from a series circuit of edge controlled R-S and J-K flip-flops 3 and 4 respectively. The result is output data $D_2$ synchronous with the frequency $f_2$.

4 Claims, 3 Drawing Figures

CIRCUIT ARRANGEMENT FOR THE TRANSMISSION OF DIGITAL DATA

BACKGROUND TO THE INVENTION

This invention relates to an interface circuit for the transmission of digital data between digital data handling systems operating with different clock frequencies.

Known asynchronous interface circuits such as USARTs (Universal Synchronous/Asynchronous Receiver/Transmitter) serve for communication between microprocessors and serial input/output units. Here parallel data has to be transformed into serial data, and serial data into parallel data. For the asynchronous transmission of serial data there are transmitted, in addition to the data bits of a message, synchronising start and stop bits. The transmission speed of USARTs in digital data processing systems is relatively low. Data of faster systems, e.g. data of a pulse code modulated video signal, cannot be processed or transmitted by a USART.

SUMMARY OF THE INVENTION

According to the present invention there is provided an interface circuit for the transmission of digital data between digital data handling systems operating with different clock frequencies, the circuit comprising an edge-controlled R-S flip-flop of which the S input is supplied with a first clock signal and the R input is supplied with a second clock signal, a J-K flip-flop of which the J input is maintained at a high logic level and the K input is maintained at a low logic level, the J-K flip-flop having a clock input connected to the output of the R-S flip-flop and a reset input supplied with the second clock signal, and at least one D flip-flop having a clock input connected to the output of the J-K flip-flop and whose D input is arranged to receive digital data at the frequency of the first clock signal, whereby at the output of the D flip-flop digital data is produced in synchronism with the second clock signal.

In an embodiment of the invention the R-S flip-flop comprises a further J-K flip-flop whose J and K inputs are maintained at a high logic level and which is triggered by negative-going edges, the further J-K flip-flop having inverting and non-inverting outputs, a first NAND gate whose output is connected to the clock input of the further J-K flip-flop, a second NAND gate whose output is connected to a first input of the first NAND gate, one of the inputs of the second NAND gate being connected to the non-inverting output of the further J-K flip-flop and the other input of the second NAND gate being connected to the R input of the R-S flip-flop via a first inverter, and a third NAND gate whose output is connected to a second input of the first NAND gate, one of the inputs of the third NAND gate being connected to the inverting output of the further J-K flip-flop and the other input of the third NAND gate being connected to the S input of the R-S flip-flop via a second inverter.

The invention has the advantage that it is not necessary to transmit additional bits for synchronisation, and the speed of data transmission may be greater than that of known interfaces. Simultaneously with the transmission of data, a special clock signal is generated whose average frequency is the same as the frequency of the first clock signal. The special clock signal can advantageously be used for the generation of address signals.

An embodiment of the invention will now be described by way of example with reference to the accompanying drawings.

DESCRIPTION OF THE PREFERRED EMBODIMENT

Figure 1:
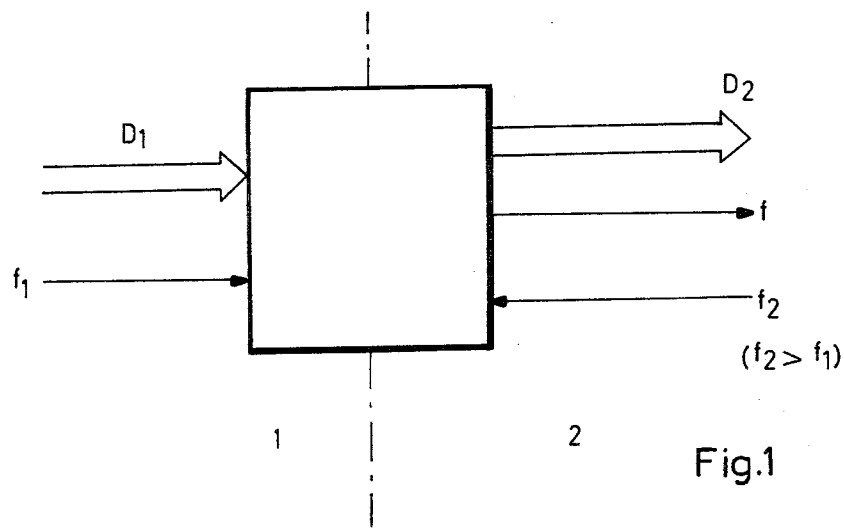
FIG. 1 is a simple block diagram illustrating the function of the present embodiment of the invention.

FIG. 1 shows an embodiment of an interface circuit according to the invention inserted into a data transmission line as an asynchronous interface in order to connect data systems having different clock frequencies. By this interface data is to be transferred to a system 2 whose clock frequency $f_2$ is greater than the clock frequency of a system 1 which provides the input data $D_1$. At a data output of the asynchronous interface circuit data $D_2$ is provided synchronously with the clock frequency $f_2$ of the system 2.

Figure 2:
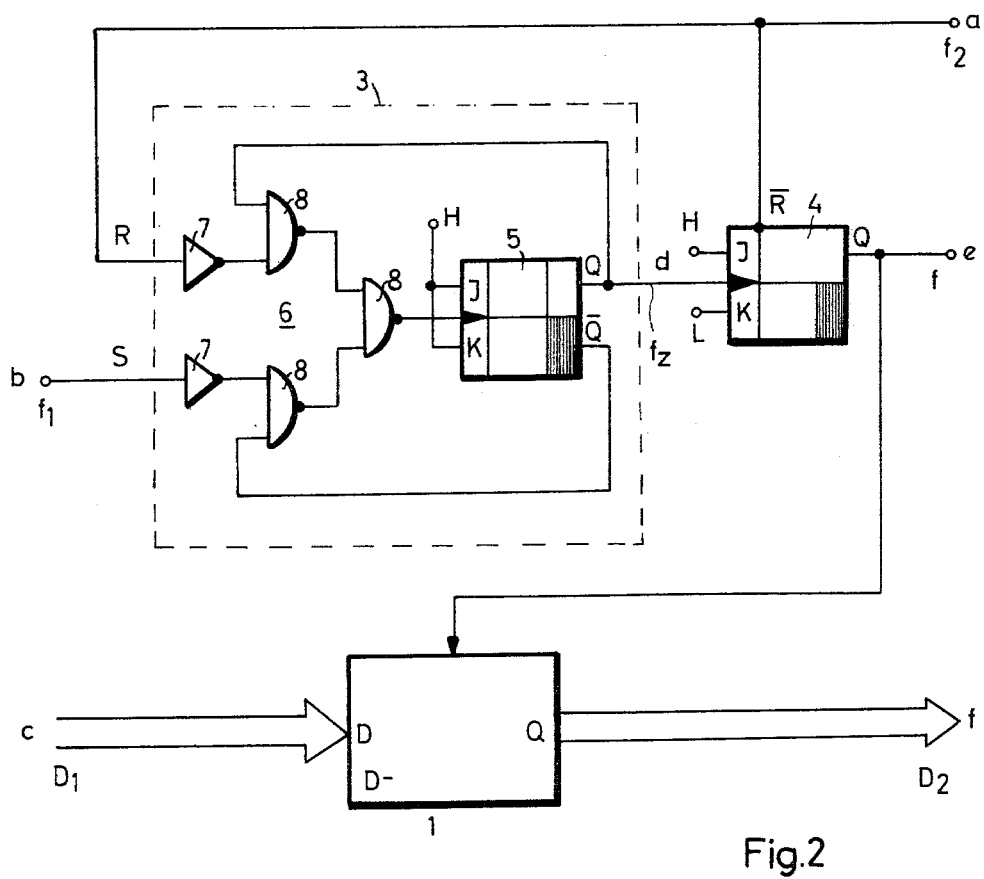
FIG. 2 shows in greater detail the elements within the interface circuit of FIG. 1, and FIG. 3 are voltage-time diagrams for explaining the operation of the circuit of FIG. 2.

In the interface circuit, FIG. 2, the digital data signal $D_1$ from the system 1 is supplied to the D-input of a register 1. It is assumed that the data signal $D_1$ is a video signal supplied by an analogue-digital converter (not shown), the video signal originally being in analogue form. The analogue-digital converter is operated with the clock frequency $f_1$. The digitalized video signal is, for example, in 8-bit parallel form. In this case the register 1 comprises eight D flip-flops in parallel. At an output Q of the register 1 the data signal $D_2$ is obtained, the clock frequency of which is the same as the clock frequency $f_2$ of the system 2. In the present example the system 2 is a digital store for storing the data signal $D_2$. The clock frequency $f_2$ is higher than the clock frequency $f_1$.

In order that the data signal $D_2$ should be delivered synchronously with the clock frequency $f_2$ of the system 2, the register 1 has to be clocked with a special clock signal $f_{Inter}$. The special clock signal $f_{Inter}$ is derived from a circuit comprising an edge controlled R-S flip-flop 3 in series with a J-K flip-flop 4. The edge controlled R-S flip-flop 3 itself contains a further J-K flip-flop 5, the output signals of which are logically connected with the signals of the clock frequencies $f_1$ and $f_2$ in a gate network 6 consisting of two inverters 7 and three NAND gates 8 in the arrangement shown, and are supplied to the clock input of the J-K flip-flop 5. Such R-S flip-flops are known from the periodical "Electronics", Jan. 6, 1977, page 106. The J and K inputs of the J-K flip-flop 5 are maintained at a high logic level H, so that the logic levels at the outputs Q and $\overline{Q}$ change with negative-going (falling) edges of the signal applied to the clock input of the J-K flip-flop 5. The result of the network 6 is that a change of the logic levels at the outputs Q and $\overline{Q}$ occurs only with positive-going (rising) edges in the signals at the inputs R and S of the R-S flip-flop 3. If such a change has already occurred by the application at one of the inputs R or S of a positive-going edge, then a further change is possible only by the presence of a positive-going edge at the other input of the R-S flip-flop 3.

In the J-K flip-flop 4 following the R-S flip-flop 3, the J-input is maintained at a high logic level H and the K-input is maintained at a low logic level L. In this J-K flip-flop 4 the signal $f_z$ applied to the clock input is effective on the output Q only with the transition of the logic level of $f_z$ from H to L, that is with negative-going edges, so that with the previously described H and L levels respectively maintained at the inputs J and K of the J-K flip-flop 4 the output Q assumes the logic level H in the presence of a negative-going edge at the clock input. The logic level at the output Q is reset to L by means of the negative-going edges of the clock frequency $f_2$ applied to the reset input $\overline{R}$. The signal at the output Q of the J-K flip-flop 4 represents the special clock signal $f_{Inter}$ for clocking the register 1.

Figure 3:
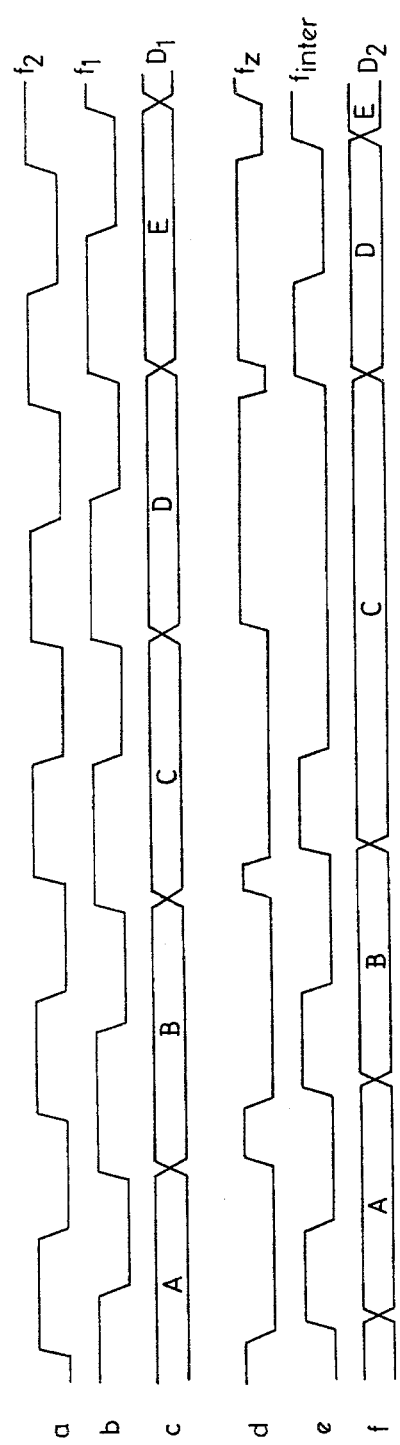

The voltage against time diagrams shown in FIG. 3 are intended to explain the operation of the circuit arrangement shown in FIG. 2. Assume that there is a clock signal $f_2$ according to FIG. 3a at the R-input of the R-S flip-flop 3, and assume that there is a clock signal $f_1$ according to FIG. 3b at the S-input of the flip-flop 3. Furthermore, assume that there is a data signal $D_1$ (FIG. 3c) at the D-input of the register 1. At the output of the R-S flip-flop 3 the signal $f_z$ will be obtained which is represented in FIG. 3d. Positive-going edges in the clock signal of FIG. 3a cause negative-going edges in the signal of FIG. 3d, and positive-going edges in the clock signal of FIG. 3b cause positive-going edges in the signal of FIG. 3d. In the presence of negative-going edges in the signal $f_z$ of FIG. 3d the logic level of the special clock signal $f_{Inter}$ (FIG. 3e) at the output Q of the J-K flip-flop 4 jumps from L to H. Resetting of the logic level H to L in FIG. 3e occurs at the transition of the logic level H to L in the signal $f_2$ of FIG. 3a. In the special clock signal $f_{Inter}$ shown in FIG. 3e it is therefore ensured that each positive-going edge is generated at a fixed time relative to a respective positive-going edge of the signal $f_2$ of FIG. 3a, but the average frequency of the special clock signal is equal to that of the clock signal $f_1$. The special clock signal switches the parallel data $D_1$ lying at the D-inputs of register 1 through to the outputs Q, by virtue of the special clock signal being applied to the clock inputs of all the D flip-flops making up the register 1, and so generates a data signal $D_2$ which is synchronous with the clock signal $f_2$.

The special clock signal $f_{Inter}$ which can be taken from the output Q of the J-K flip-flop 4 can also be used in the system 2 as an indicator for a subsequent store in order to show when a new data word is ready to be taken from the register 1 for further processing.

I claim:

1. An interface circuit for the transmission of digital data between digital data handling systems operating with different clock frequencies, the circuit comprising an edge-controlled R-S flip-flop of which the S input is supplied with a first clock signal and the R input is supplied with a second clock signal, a J-K flip-flop of which the J input is maintained at a high logic level and the K input is maintained at a low logic level, the J-K flip-flop having a clock input connected to the output of the R-S flip-flop and a reset input supplied with the second clock signal, and at least one D flip-flop having a clock input connected to the output of the J-K flip-flop and whose D input is arranged to receive digital data at the frequency of the first clock signal, whereby at the output of the D flip-flop digital data is produced in synchronism with the second clock signal.

2. An interface circuit according to claim 1, wherein the R-S flip-flop comprises a further J-K flip-flop whose J and K inputs are maintained at a high logic level and which is triggered by negative-going edges, the further J-K flip-flop having inverting and non-inverting outputs, a first NAND gate whose output is connected to the clock input of the further J-K flip-flop, a second NAND gate whose output is connected to a first input of the first NAND gate, one of the inputs of the second NAND gate being connected to the non-inverting output of the further J-K flip-flop and the other input of the second NAND gate being connected to the R input of the R-S flip-flop via a first inverter, and a third NAND gate whose output is connected to a second input of the first NAND gate, one of the inputs of the third NAND gate being connected to the inverting output of the further J-K flip-flop and the other input of the third NAND gate being connected to the S input of the R-S flip-flop via a second inverter.

3. An interface circuit according to claim 1, wherein n D flip-flops are provided for the parallel transmission of a data signal with a word length of n bits, the clock inputs of all of the D flip-flops being connected to the output of the first J-K flip-flop.

4. An interface circuit according to claim 1, wherein the signal from the output of the first J-K flip-flop is used for indicating further signal processing steps of the data delivered by the D flip-flop.

* * * * *